3,094,550
THIO- AND DITHIO-PHOSPHORUS ACID ALKYL ESTERS AND PROCESS FOR THE PRODUCTION THEREOF
Hans-Helmut Schlör, Wuppertal-Barmen, and Gerhard Schrader, Wuppertal-Cronenberg, Germany, assignors to Farbenfabriken Bayer Aktiengesellschaft, Leverkusen, Germany, a corporation of Germany
No Drawing. Filed Apr. 3, 1962, Ser. No. 184,675
Claims priority, application Germany Apr. 13, 1961
18 Claims. (Cl. 260—461)

The present invention relates to and has as its objects new and useful insecticidal active compounds and processes for their production. The new compounds may be represented by the following general formula

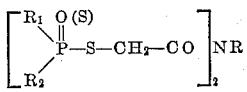

wherein $R_1$ and $R_2$ are preferably lower alkyl or alkoxy groups, whilst R stands for hydrogen or an optionally substituted aliphatic radical.

In the specification of the U.S. Patent No. 2,912,452 there has already been described a process for the production of thiophosphoric or dithiophosphoric acid esters of the general formula

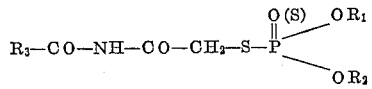

wherein $R_3$ stands for an alkyl or aryl radical which may be substituted and $R_1$ and $R_2$ are alkyl radicals with at most 4 carbon atoms, characterised in that acylated chloroacetamides of the formula

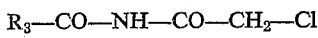

in which $R_3$ has the abovementioned significance, are reacted with the alkali metal or ammonium salts of thio- or dithio-phosphoric acid-O,O-dialkyl esters.

It has now been found that also the bis-(chlor-acetyl)-imide (also designated dichloro-diacetamide) of the formula

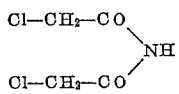

or its N-substitution products can be smoothly reacted with the alkali metal or ammonium salts of dialkylthiol- or -thionothiol-phosphoric (-onic, -inic)-acids, whereby thio- or dithio-phosphoric (-onic, -inic)-acid esters of the general formula

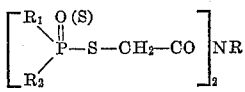

are produced in good yields.

In the last mentioned formula, $R_1$ and $R_2$ mean preferably lower alkyl- or alkoxy-groups, while R stands for hydrogen or an optionally substituted aliphatic radical.

The preparation of the inventive compounds is suitably carried out within the presence of a solvent or solvent mixture, in which the thio- or dithio-phosphoric (-onic, -inic) acid salt to be reacted is readily soluble. Mixtures of water and a water-miscible solvent, especially a lower alcohol, have proved particularly useful.

Furthermore, it is of advantage for attaining especially good yields, to effect the reaction at slightly to moderately elevated temperatures and to heat the reaction mixture for a little longer after combining the starting components.

Some of the thio- or dithio-phosphoric (-onic, -inic)-acid esters obtainable according to the invention are obtained in the form of water-soluble oils, but some are crystalline products with a sharp melting point, which may be readily further purified by recrystallization from the usual organic solvents or mixtures of solvents.

As well as the thio- or dithio-phosphoric acid esters described in the U.S. patent specification 2,912,452, the compounds according to the invention are distinguished by an outstanding insecticidal activity and on the other hand by a relatively low toxicity to warm-blooded creatures. The inventive products are, therefore, intended to find application as pesticides mainly in plant protection.

The compounds of the present invention very effectively kill insects like flies, mites, aphids, etc. They distinguish themselves especially by a good contact-insecticidal activity and at the same time by an activity on eating insects such as caterpillars. For this purpose they are applied by methods and in manners known for insecticides based on phosphoric acid esters, i.e. mainly in combination with solid or liquid extenders or diluents, in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary witth commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae (I) 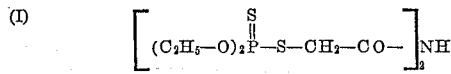

(II) 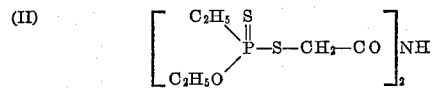

(III) 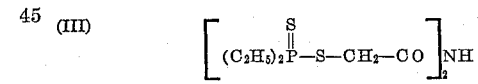

have been tested.

(a) *Against spider mites (contact-insecticidal action).*—Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours, 8 days. The following results have been obtained:

| Compound | active concentration (percent active ingredient/water) | killing rate (percent) |
|---|---|---|
| I | 0.01 | 100 |
| II | 0.01 | 100 |
| III | 0.1 | 100 |

(b) *Against aphids (contact-insecticidal action)* of the type Doralis fabae.—Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | active concentration (percent active ingredient/water) | killing rate (percent) |
|---|---|---|
| II | 0.001 | 100 |
| III | 0.1 | 100 |

(c) *Against aphids (systemic action) of the type* Doralis fabae.—Heavily infested bean plants (*Vicia faba*) have been planted in pots of about 5 inches diameter and are watered with aqueous emulsions as prepared above in a concentration as shown below. The aqueous emulsions are taken up by the infested bean plants. Evaluation occurred after 48 hours. The following results have been obtained:

| Compound | active concentration (percent active ingredient/water) | killing rate (percent) |
|---|---|---|
| I | 0.1 | 100 |
| III | 0.1 | 100 |

The following examples illustrate the invention as claimed:

Example 1

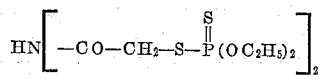

At 50° C., 21 g. (0.125 mol) of dichloro-diacetamide (M.P. 197–200° C.) are introduced into a solution of 61 g. (0.3 mol) of the ammonium salt of the O,O-diethyl-thionothiol phosphoric acid in 200 cc. of water and 100 cc. of ethanol, and subsequently the reaction mixture is heated for another 3 hours to 60° C. After cooling the mixture is extracted with chloroform, the chloroform solution dried over sodium sulphate and then the solvent distilled off under vacuum. The residue is recrystallized from a benzene-petroleum ether mixture and in this way 46 g. (78% of the theoretical yield) of bis-(O,O-diethyl-thionothiolphosphoric acid-S-acetyl)-imide of melting point 54 to 56° C. are obtained.

The mean toxicity ($LD_{50}$) of the compound on rats per os amounts to 25 mg. per kg. of animal. Spider mites are completely destroyed by 0.01% solution and mosquito larvae even by 0.001% solution of the ester. The systemic activity of 0.1% solution is 100%.

By exactly the same way there may be obtained the following compound.

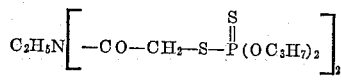

Example 2

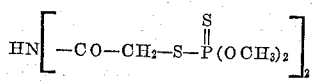

At 50° C., 25 g. (0.15 mol) of dichloro-diacetamide are introduced into a solution of 70 g. (0.4 mol) of the ammonium salt of the O,O-dimethyl-thionothiol-phosphoric in 250 cc. of water and 150 cc. of methanol and the mixture then is held for another 3 hours at 60° C. The working up of the reaction mixture is carried out as descriped in the preceding example. 36 g. (58% of the theoretical yield) of bis-(O,O-dimethyl)-thionothiol-phosphoric acid-S-acetyl)-imide are obtained in the form of a red-brown oil.

The compound exhibits on rats per os a mean toxicity ($LD_{50}$) of 500 mg. per kg. of animal. Caterpillars, flies, aphids and spider mites are completely killed by 0.1% solutions of the ester. The systemic activity of 0.1% solutions against aphids on oats (sitobium granarium) is 100%. Moreover the compound shows an ovicidal activity against the eggs of spider mites. In the same manner there may be obtained the following compound.

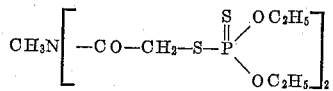

Example 3

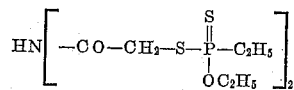

At 50° C., 15 g. (0.0885 mol) of dichloro-diacetamide are introduced into a solution of 42 g. (0.2 mol) of the potassium salt of the ethyl-O-ethylthionothiol-phosphonic acid in 150 cc. of water and 75 cc. of ethanol. The mixture is then heated for a further 3 hours to 60° C. and worked up as described in Example 1. There are obtained 29 g. (75% of the theoretical amount) of bis-(ethyl-O-ethylthionothiol-phosphonic acid-S-acetyl)-imide. The product melts after recrystallizing from a benzene-petrol ether mixture at 38 to 40° C.

Caterpillars and fliies are killed completely by 0.1% solutions of the ester, aphids are destroyed by 0.001% solutions and spider mites by 0.01% solutions to 100%. Moreover the compound possesses an ovicidal activity against the eggs of spider mites. The systemic action of 0.1% solutions against aphids on oats (sitobium granarium) is 100%. By exactly the same method there may be produced the following compounds:

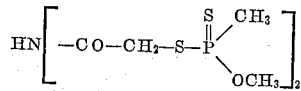

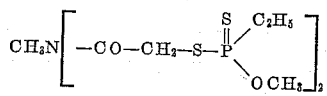

Example 4

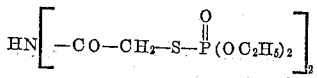

A solution of 93 g. (0.5 mol) of the ammonium salt of the O,O-diethyl thiol-phosphoric acid in 250 cc. of water and 150 cc. of ethanol are treated at 50° C. portionwise with 34 g. (0.2 mol) of dichloro-diacetamide. After subsequently heating the reaction mixture for 3 hours at 60° C., it is worked up as in Example 1. There are obtained 46 g. (53% of the theoretical yield) of bis-(O,O-diethyl-thiol-phosphoric acid-S-acetyl)-imide in the form of an oil.

Spider mites, aphids, flies and caterpillars are killed to 100% by 0.1% of the ester. The systemic action of 0.1% solution of the compound against aphids on oats (sitobium granarium) is 100%. Moreover the ester shows an ovicidal activity against the eggs of spider mites.

In the same way there may be obtained the following compounds:

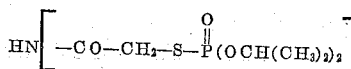

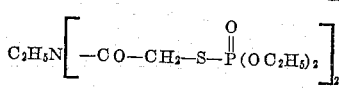

Example 5

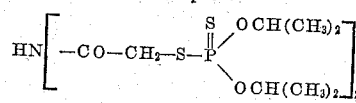

34 g. (0.2 mol) of dichloro-diacetamide are introduced at 50° C. into a solution of 92 g. (0.4 mol) of the ammonium salt of the O,O-diisopropyl thionothiol-phosphoric acid in 250 cc. of water and 150 cc. of isopropanol. After heating the mixture for 3 hours to 60° C. the latter is cooled, the separated oil taken up in chloroform, the chloroform solution washed twice with water and then dried over sodium sulphate. The solvent is then distilled off. There remain 52 g. (50% of the theoretical amount) of an oil which slowly solidifies in a crystalline form. The melting point of the bis-(O,O-diisopropyl thionothiol-phosphoric acid-S-acetyl)-imide after recrystallisation of the product from a benzene-petrol ether mixture lies at 46 to 48° C.

The compound exhibits on rats per os a mean toxicity (LD$_{50}$) of 200 mg. per kg. of animal. Caterpillars are killed completely by 0.1% solutions of the ester. By exactly the same method there may be prepared the following compounds:

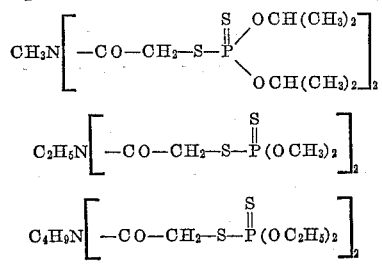

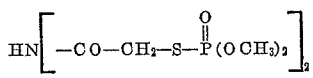

*Example 6*

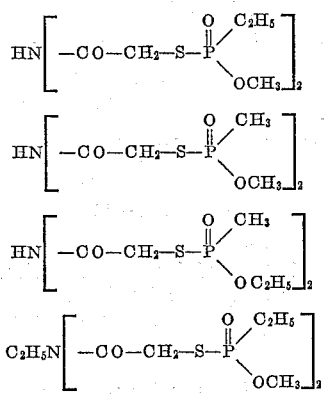

96 g. (0.6 mol) of the ammonium salt of the O,O-dimethylthiol-phosphoric acid in a mixture of 250 cc. of water and 250 cc. of methanol are treated at 50° C. with 51 g. (0.3 mol) of dichlorodiacetamide. The reaction mixture is then heated for another 3 hours at 60° C., cooled, saturated at 20° C. with sodium sulphate and the mixture is extracted several times with methylene chloride. After careful drying of the methylene chloride solution over sodium sulphate, the solvent is completely removed in a vacuum finally at a pressure of 2 mm. Hg and a bath temperature of 60° C. As residue there are obtained 48 g. (42% of the theoretical yield) of bis-(O,O-dimethylthiol-phosphoric acid-S-acetyl)-imide in the form of a water soluble oil.

The mean toxicity (LD$_{50}$) of the compound amounts to 175 mg. per kg. of animal (rat, administered orally). Caterpillars, flies, aphids and spider mites are killed to 100% by 0.1% solution of the ester, which moreover has an ovicidal activity against the eggs of spider mites. The systemic action of 0.1% solutions of the compound against aphids on oats (sitobium granarium) is 100%. By the same way there may be obtained the following compounds:

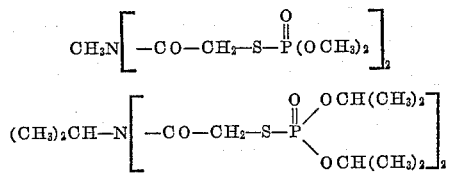

*Example 7*

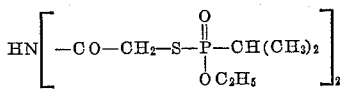

28 g. (0.5 mol) of potassium hydroxide dissolved in 120 cc. of water are added dropwise at 20° C. with external cooling with ice-water and with stirring, to a solution of 84 g. (0.5 mol) of isopropyl-O-ethyl-thiolphosphonic acid (B.P. 57 to 62° C./0.01 mm. Hg) in 250 cc. of ethanol. The neutral-reacting mixture is then heated to 50 to 60° C. and 42 g. (0.25 mol) of dichloro-diacetamide are then added. The reaction mixture is heated for an hour to gentle boiling, cooled again, extracted twice with benzene and the benzene solution is washed once with water. After drying the organic phase over sodium sulphate the mixture is worked up as described in the preceding example. 62 g. (58% of the theoretical yield) of bis-(isopropyl-O-ethylthiolphosphonic acid-S-acetyl)-imide are obtained in the form of an oil.

The mean toxicity (LD$_{50}$) of the compound on rats per os amounts to 220 mg. per kg. of animal. Caterpillars and flies are killed completely by 0.1% solutions of the ester. The systemic action of 0.1% solutions against aphids on oats (sitobium granarium) is 100%.

By exactly the same method there may be prepared the following compounds:

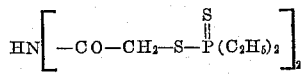

*Example 8*

38 g. (0.2 mol) of the potassium salt of the diethyl thionothiol-phosphinic acid are dissolved in a mixture of 150 cc. of water and 100 cc. of ethanol. At 50° C. 17 g. (0.1 mol) of dichloro-diacetamide are introduced into this solution and subsequently the mixture is heated for 3 hours to 60° C. The working up of the reaction mixture is carried out as described in the preceding examples. There are obtained 22 g. (54% of the theoretical yield) of an oil which after some time solidifies in a crystalline form and melts after recrystallizing from a benzene-cyclohexen-mixture at 36 to 39° C.

The compound possesses a mean toxicity (LD$_{50}$) of 500 mg. per kg. of animal (rats, oral administration). Aphids and spider mites are destroyed completely by 0.1% solutions of the ester. The compound shows an ovicidal activity against the eggs of spider mites. The systemic action of 0.1% solutions against aphids is 100%.

In the same manner there may be prepared the following compounds:

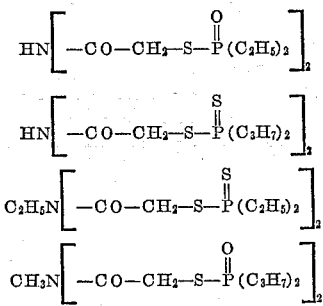

Example 9

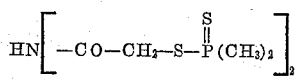

At 50° C. 17 g. (0.1 mol) of dichloro-diacetamide are introduced into a solution of 33 g. (0.2 mol) of the potassium salt of the dimethyl thionothiol-phosphinic acid in 150 cc. of water and 100 cc. of methanol. Subsequently the mixture is warmed for 3 hours to 60° C. and then worked up as it has already been described in the previous examples. There are obtained in this way 23 g. (66% of the theoretical amount) of a brown-red oil.

The mean toxicity ($LD_{50}$) of the compound on rats amount to 750 mg. per kg. of animal (rats, administered orally). Caterpillars, flies and spider mites are killed to 100% by 0.1% solutions of the ester, which also possesses an ovicidal action against the eggs of spider mites. The systemic activity of 0.1% solutions against aphids on oats (sitobium granarium) is 100%. By the same way there may be produced the following compound.

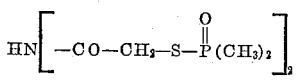

We claim:
1. A compound of the formula

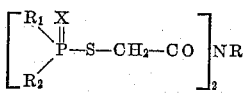

wherein $R_1$ and $R_2$ stand for members selected from the group consisting of lower alkyl having up to 4 carbon atoms and lower alkoxy having up to 4 carbon atoms; R stands for a member selected from the group consisting of hydrogen and a lower alkyl radical having up to 4 carbon atoms and X stands for a member selected from the group consisting of oxygen and sulfur.

2. A compound of the formula

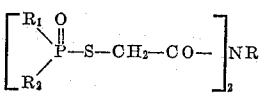

wherein $R_1$ and $R_2$ stand for members selected from the group consisting of lower alkyl having up to 4 carbon atoms and lower alkoxy having up to 4 carbon atoms, and R stands for a member selected from the group consisting of hydrogen and a lower alkyl radical having up to 4 carbon atoms.

3. A compound of the formula

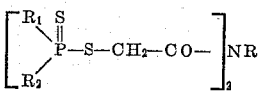

wherein $R_1$ and $R_2$ stand for members selected from the group consisting of lower alkyl having up to 4 carbon atoms and lower alkoxy having up to 4 carbon atoms, and R stands for a member selected from the group consisting of hydrogen and a lower alkyl radical having up to 4 carbon atoms.

4. A compound of the formula

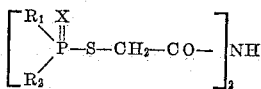

wherein $R_1$ and $R_2$ stand for members selected from the group consisting of lower alkyl having up to 4 carbon atoms and lower alkoxy having up to 4 carbon atoms, and X stands for a member selected from the group consisting of oxygen and sulfur.

5. A compound of the formula

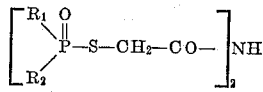

wherein $R_1$ and $R_2$ stand for members selected from the group consisting of lower alkyl having up to 4 carbon atoms and lower alkoxy having up to 4 carbon atoms.

6. A compound of the formula

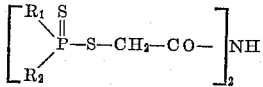

wherein $R_1$ and $R_2$ stand for members selected from the group consisting of lower alkyl having up to 4 carbon atoms and lower alkoxy having up to 4 carbon atoms.

7. The compound of the following formula

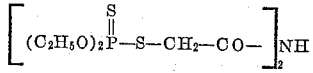

8. The compound of the following formula

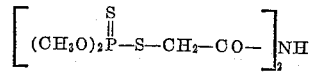

9. The compound of the following formula

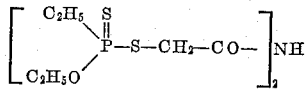

10. The compound of the following formula

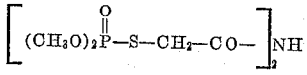

11. The compound of the following formula

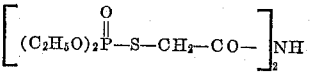

12. The compound of the following formula

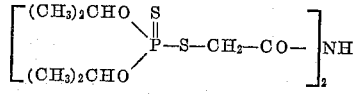

13. The compound of the following formula

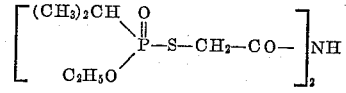

14. The compound of the following formula

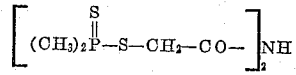

15. The compound of the following formula

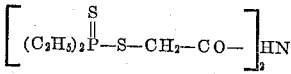

16. A compound of claim 1 wherein $R_1$ and $R_2$ are each lower alkyl having up to 4 carbon atoms.
17. A compound of claim 1 wherein $R_1$ and $R_2$ are each lower alkoxy having up to 4 carbon atoms.
18. A compound of claim 1 wherein $R_1$ is lower alkyl having up to 4 carbon atoms and $R_2$ is lower alkoxy having up to 4 carbon atoms.

No references cited.